Dec. 8, 1925.  1,564,914
L. K. VAUGHAN
ALMOND HULLING AND SEPARATING MACHINE
Filed Nov. 3, 1923    4 Sheets-Sheet 1

INVENTOR.
Louis K. Vaughan
BY
ATTORNEY

Dec. 8, 1925.  1,564,914
L. K. VAUGHAN
ALMOND HULLING AND SEPARATING MACHINE
Filed Nov. 3, 1923    4 Sheets-Sheet 2

INVENTOR.
Louis K. Vaughan
BY
ATTORNEY

Dec. 8, 1925.

L. K. VAUGHAN 1,564,914

ALMOND HULLING AND SEPARATING MACHINE

Filed Nov. 3, 1923         4 Sheets-Sheet 3

INVENTOR.
Louis K. Vaughan
BY
ATTORNEY

Dec. 8, 1925. 1,564,914
L. K. VAUGHAN
ALMOND HULLING AND SEPARATING MACHINE
Filed Nov. 3, 1923 4 Sheets-Sheet 4
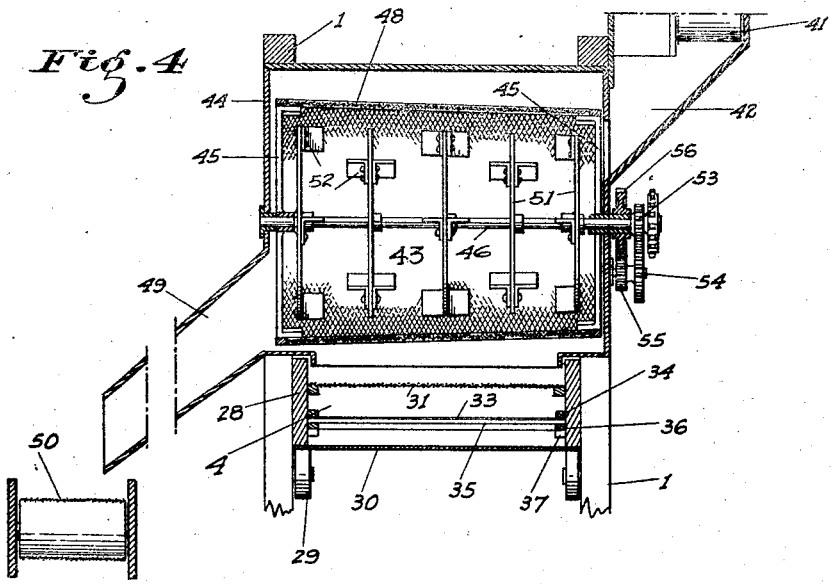
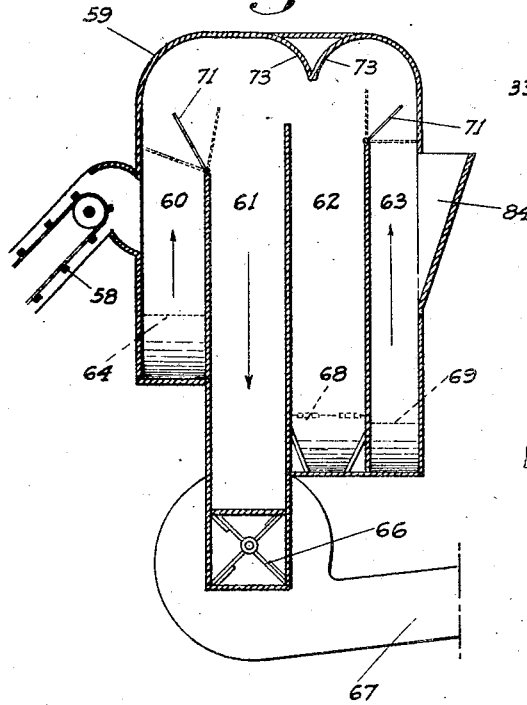
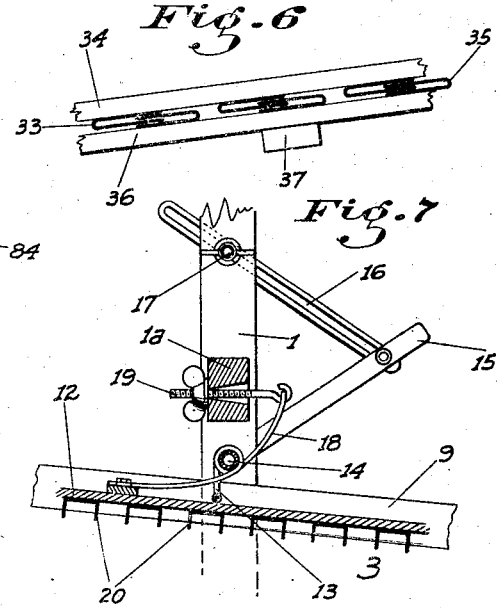
INVENTOR.
Louis K. Vaughan
BY
ATTORNEY Patented Dec. 8, 1925.

1,564,914

UNITED STATES PATENT OFFICE.

LOUIS K. VAUGHAN, OF WOODLAND, CALIFORNIA.

ALMOND HULLING AND SEPARATING MACHINE.

Application filed November 3, 1923. Serial No. 672,455.

*To all whom it may concern:*

Be it known that I, LOUIS K. VAUGHAN, a citizen of the United States, residing at Woodland, county of Yolo, State of California, have invented certain new and useful Improvements in Almond Hulling and Separating Machines; and I do declare the following to be a full, clear, and exact description of the same, reference being had to the accompanying drawings, and to the characters of reference marked thereon, which form a part of this application.

This invention relates to improvements in almond hulling, separating, cleaning, and cracking machines, and is particularly an improvement over my Patent No. 1,294,852, granted me on the 18th day of February, 1919.

In the present invention, the main hulling, or cracking of the nuts, as the case may be, is done by a mechanism operating on the same principle as in the machine shown in said patent, but of a more efficient nature and with a wider range of adjustability, due to various improvements in construction.

Additional screening means over what is shown in the previous device have also been added to the present machine to insure a more thorough treatment of the almonds.

A drum and beater mechanism, to treat almonds not hulled by the initial or main hulling device is also provided, the nuts to be hulled in said drum being fed thereto from the additional screening or separating means above mentioned.

I have also provided an air-current producing means arranged to act on the hulled nuts to remove therefrom all foreign matter lighter than said nuts, so that the latter will be delivered to the final sorting table in an absolutely clean condition.

Means are also provided for separating and saving any kernels which, when the machine is adjusted for hulling operations only, are very liable to become mixed with the hulls and other refuse.

These and other advantages evident hereinafter, are accomplished by means of such structure and relative arrangement of parts as will fully appear by a perusal of the following specification and claims.

In the drawings similar characters of reference indicate corresponding parts in the several views:

Fig. 4 is a transverse section on the line 4—4 of Fig. 1.

Fig. 5 is a longitudinal section of the vacuum-cleaning box.

Fig. 6 is an enlarged fragmentary section of an adjustable screening structure.

Fig. 7 is an enlarged view of the upper screen-cover adjustment mechanism.

Fig. 8 is a cross section of the sorting and adjacent belts or conveyors.

Fig. 9 is a fragmentary detail of a drum-screen mounting.

Figure 1:
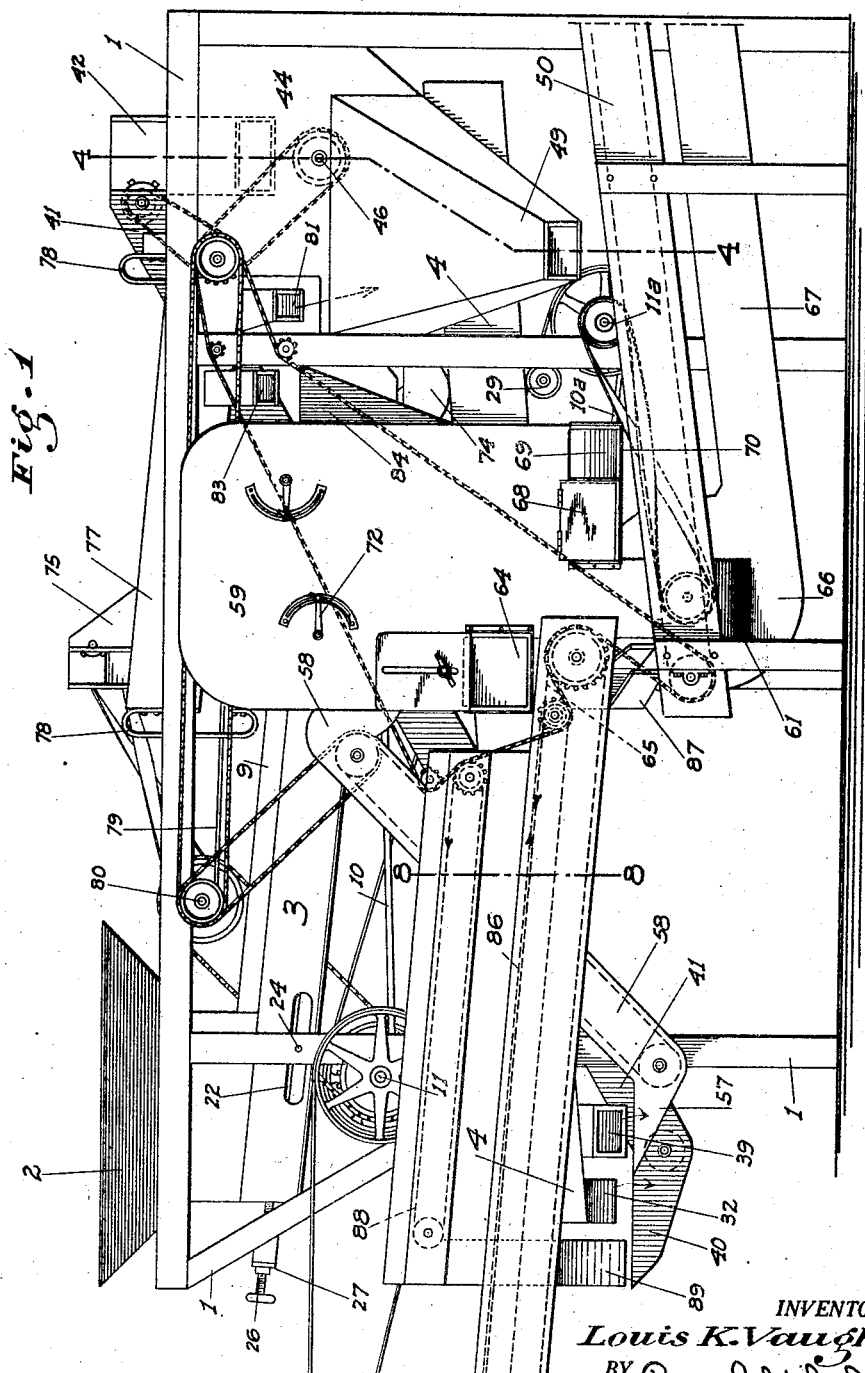
Fig. 1 is a side view of the machine.
Figure 2:
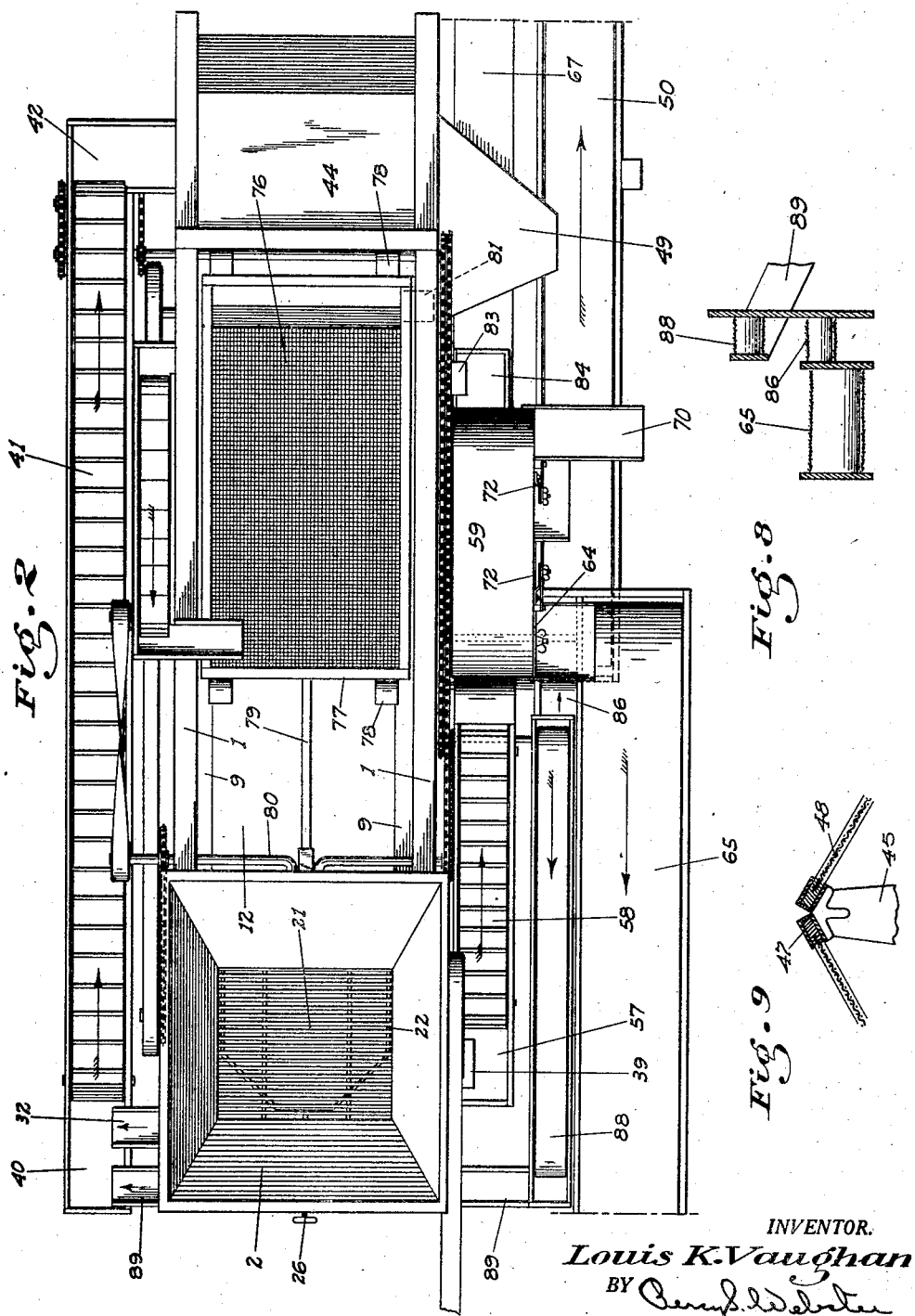
Fig. 2 is a top plan view of the same.

Referring now more particularly to the characters of reference on the drawings, the numeral 1 denotes the supporting framework of the machine, of suitable dimensions for the purpose.

Mounted on top of the frame at one end is a hopper 2 which discharges onto a hulling and screening structure designated generally at 3 and sloping downwardly from the hopper.

The lower end of said hulling structure lies above a lower screening structure designated generally at 4, which slopes in the opposite direction to the structure 3 and under the same.

The structure 3 comprises a box-like member having sides 5 and a solid bottomplate 6, the latter terminating in a discharge chute 7 at the lower end thereof. The structure 3 is movable longitudinally of the framework 1, the walls 5 resting on rollers 8 mounted on the frame, while guide beams 9 fixed on said frame serve to prevent vertical movement of the structure 3. Said structure is reciprocated through a suitable distance by means of an arm 10 pivoted thereon and eccentrically connected to a driven shaft 11 journaled on the frame 1.

Positioned between the bars 9 but independent thereof is a solid cover member 12 suspended from flexible members 13 wrapped around independent shafts 14 journaled at longitudinally spaced intervals in the frame 1 above and transversely of said cover. To each shaft is attached a lever or handle 15 whereby the shaft may be turned.

The lever has a slotted link 16 extending to the adjacent frame member, a clamping bolt or screw 17 passing through said frame member and link whereby to enable the latter, and consequently the lever and shaft, to be held in any desired position. (See Fig. 7.)

The cover 12 is therefore free to rise, the suspension members 13 being flexible, but its lowering is controlled by movement of the various levers.

To prevent undue freedom of upward movement of the cover, springs 18 are provided, these springs being in the form of coils surrounding the shafts 14, one end of each spring bearing against the cover and the other being attached to the end of a horizontally adjustable bolt 19 mounted in a cross beam 1a of the frame 1, above the cover.

In this manner, the tension on the cover may be kept the same irrespective of the position of the latter relative to the bars 9, or the tension may be varied according to different requirements in operation.

Fixed on the under side of the cover and extending for the full length thereof are transversely disposed and longitudinally spaced ribs or projections 20, set at right angles to the cover, and preferably formed from angle or channel irons secured on said cover.

Mounted in the walls 5 and extending lengthwise thereof in transversely disposed order are grate bars 21, preferably round rods of about 3/8" diameter with the same spacing therebetween, these bars being disposed a certain distance below the ribs 20, which distance is of course varied by adjusting the cover.

Positioned between the walls 5 below the grate bars but independent of said walls are longitudinal bars 22 forming supports for transversely disposed and upwardly projecting ribs 23, preferably formed of angle irons suitably spaced. This structure I term a brush mechanism, for a reason hereinafter evident.

The bars 22 are stationary relative to the walls 5 and grate bars therein, and are mounted on transverse rods 24 secured in the frame 1 at certain points, these rods passing through slots 25 formed in lugs 22a projecting downwardly from the bars 22, the slots being disposed at an angle to a longitudinal horizontal plane. It will therefore be seen that if the bars 22 are moved longitudinally, they will at the same time be raised or lowered, altering the distance between the ribs 23 and grate bars 21.

Such movement is imparted to this structure at will by any suitable means, such as for instance a turnable screw 26 flexibly connected at one end to one end of the brush structure and threaded through a member 27 mounted on the framework 1.

The screening structure 4 comprises side walls 28 supported on rollers 29 journaled on the frame 1 at convenient intervals. A plate 30, open at the lower end of the structure, forms the bottom thereof.

Extending lengthwise of the walls 28 a certain distance below the top edges thereof is a coarse-mesh screen 31 which discharges into a chute 32 at the lower end of the structure. A certain distance under the screen 31 is an adjustable screening structure comprising transversely disposed and longitudinally spaced plates 33 bent in the form of very narrow channels with their sides horizontally disposed and secured in common to bars 34 adjacent the walls 28 and secured thereto. Telescoped or dovetailed into the members 33 are similar but oppositely disposed plates 35, mounted in common on bars 36 slidably supported on blocks 37 secured to the walls 38.

Longitudinal adjustment of the bars 36 is had by suitable means as for instance a screw 38 threaded through the upper end of the structure 4 and attached to said bars. By thus moving the bars, it will be seen that the spacing between the members 35 and adjacent members 34 may be altered at will.

The chute 32 discharges into the hopper 40 of an elevator 41 which in turn discharges into a hopper 42 leading to the interior of a drum 43 enclosed by walls 44 mounted on the frame 1 at the rear end thereof, which is the end opposite the main hopper 2.

This drum comprises end spiders 45 turnably mounted on a shaft 46 journaled in the walls 44, and extending transversely of the machine. The spider-arms, preferably six in number, have oppositely disposed grooved members 47 at their outer ends (see Fig. 9) forming supports for flat removable screen-covered frames 48, of which there are also six, and which thus form of the drum a hexagonally shaped structure, the screen-frames being symmetrically disposed relative to the shaft.

Figure 3:
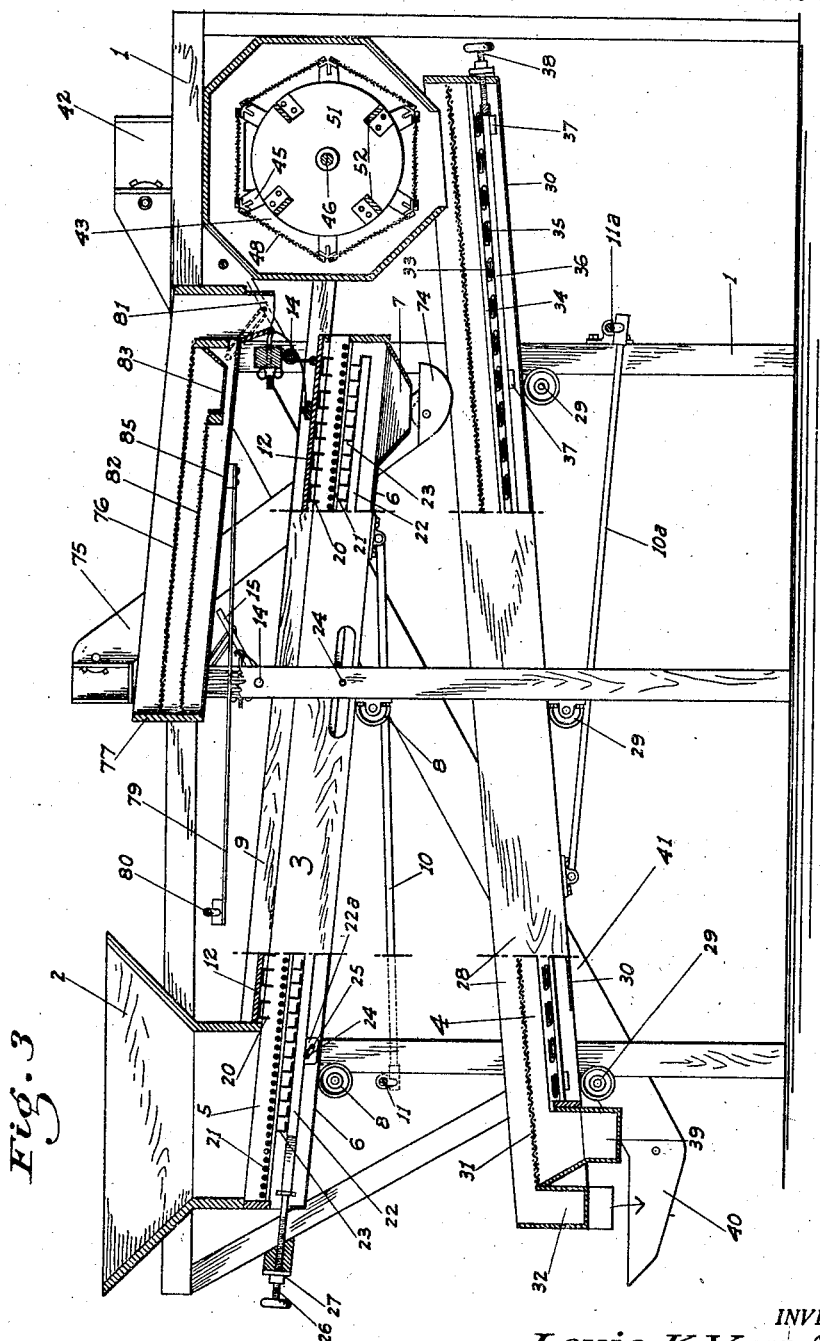
Fig. 3 is a longitudinal section, certain parts being omitted to better emphasize the remainder.

The spider at the hopper end of the drum has shorter arms than that at the other end, so that the screen frames, when positioned under the shaft, have a downward slant from the hopper end to the opposite end of the drum as shown in Fig. 3, said opposite end discharging into a chute 49 formed with the walls 44, which chute in turn discharges onto a refuse belt or other form of conveyor 50 extending parallel to the machine on the outside of the framework 1.

Fixed on the shaft 46 is a plurality of discs 51 supporting beater members consisting of angle plates 52 projecting at intervals at right angles to the discs and parallel to the shaft.

The shaft is driven by any suitable means, and the drum rotated in common therewith but at a slower speed, by means of a pinion 53 fixed on the shaft which meshes with a gear 54 journaled on the adjacent wall. Mounted in common with the gear 54 is a pinion 55 meshing with a pinion 56 attached to the adjacent one of the spiders; (see Fig. 3) the proportions of the gears being preferably such that a speed ratio of 12 to 1 between the shaft and drum will be had.

The lower end of the drum enclosure is open, and discharges onto the screening structure 4, which projects beyond the end of the upper structure 3.

The chute 39 discharges into the hopper 57 of an elevator 58 which empties into a suction or vacuum box 59 mounted between the conveyor 50 and frame 1.

This box is preferably divided into four vertical chambers 60, 61, 62, and 63, longitudinally disposed relative to the machine, and all communicating with each other at their upper ends (see Fig. 5).

The elevator 58 discharges into chamber 60, intermediate the top and bottom thereof, said chamber having at its lower end an opening 64, adjustable as to size, and delivering onto a picking or sorting table consisting of a slowly driven belt 65, moving in a direction away from the opening 64.

The lower end of the chamber 61, next to chamber 60, is connected to the intake of a centrifugal fan 66 of suitable character, the discharge flue 67 of which preferably extends parallel to the refuse belt 50.

The next chamber has an opening at its lower end discharging onto the conveyor 50, said opening being normally closed by a flap door 68 hinged along its upper edge.

The final chamber 63 has an opening 69 at its lower end, which discharges onto a chute 70 extending over the conveyor 50.

Between the chambers 60 and 61, and 63 and 62, are independent valves or gates 71, controlled from outside the structure 59 by handles 72.

Between the chambers 61 and 62, and 63 and 62, at their upper and communicating ends, are curved deflector or baffle plates 73, set back to back and terminating at their lower ends above the chamber 62.

By means of this suction box structure, the fan when driven will draw air either from chamber 60 or 63, or both, the volume of air drawn from either one depending upon the extent to which either chamber is constricted by manipulation of the valves 71.

Any material therefore emptied into the chambers 60 and 63 will be subjected to the suction created by the operation of the fan, the force of this suction being regulated so that only matter of a certain weight will be raised in the chambers 60 and 63, anything heavier falling down to the exit openings thereof.

Anything relatively light in such matter will be drawn down the fan-intake chamber or flue 61 and passed out through the discharge flue 67, while I have found that heavier material has a tendency to be thrown across and beyond the flue 61. For this reason the baffles 73 are placed to cause all such material to be deflected into the chamber 62, in which there is normally no air current, the door 68 thereof being held closed by reason of the tendency to vacuum within. When the weight of the accumulated matter in chamber 62, pressing against the door, overcomes the air pressure, the door will open, allowing enough of the matter to drop out onto the refuse belt until the weight within is lightened so that the door will again be closed, and so on. This chamber then, as will be evident, is automatically discharging.

The discharge chute 7 of the upper or main hulling structure 3 empties into the hopper 74 of an elevator 75 which discharges onto the upper and coarse-mesh screen 76 of a shaker 77 set on a slope and suspended from springs 78 and reciprocated by means of a rod or bar 79 eccentrically driven from a shaft 80.

The screen 76 discharges into a chute 81 at the lower end of the shaker which in turn discharges into the chute 49.

Below the screen 76 is a fine mesh screen 82 which discharges into a chute 83 which in turn discharges into a hopper 84 projecting from the side of the chamber 63 of the suction box 59 and leading to said chamber.

A bottom plate 85 is provided in the shaker 77 under the lower screen, said plate emptying into chute 81.

Arranged in connection with the sorting belt 65, preferably on the same level but back of the same is a narrower refuse-carrying belt or conveyor 86 arranged to move in the opposite direction to said sorting belt and discharging at its head end into a chute 87 which delivers onto the main refuse conveyor 50.

Positioned in the same vertical plane as the belt 86 and a suitable distance thereabove is another conveyor 88, arranged to travel in the same direction as the main belt 65, and discharging at its head end into a chute 89, which empties into the hopper 40 of the elevator 41 which leads to the beater drum.

All the belts, conveyors, elevators and shafts are driven in common from a single source of power and hence are all coupled up in suitable driving relation so that the desired speed ratios will be obtained. I have shown on the drawings one manner in which this driving relation may be had, but since it is capable of considerable variation within the skill of any good designer or mechanic, I do not feel it necessary to describe or go into any detail as to this feature.

The operation of the apparatus is as follows: The almonds to be hulled, usually including a quantity of leaves, twigs, loose hulls, etc., are dumped into the hopper 2, from which they will drop onto the grate bars 21. Due to the downward slope of the structure 3 and its reciprocating movement, the material will gradually pass under the bars or ribs 20 and work toward the lower end of the structure. The grate bars moving while the bars 20 are stationary, a rubbing action is exerted on the unhulled nuts which causes the hulls to be loosened and the majority, if not all of the nuts to leave the hulls. Owing to the adjustability and positive control of setting of the cover 12, the grate and cover bars may be set just close enough to work on unhulled nuts, leaving the hulled nuts to move along the grate without being touched by the cover bars. Owing to the narrow space between the grate and cover bars, the almonds are spread out in a thin sheet, and each nut is worked on independently.

A certain number of the hulls, besides all small sized matter, including any meats or kernels, will pass between the grate bars and onto the screen.

Should any of this matter, especially twigs and hulls, tend to stick between the bars, the stationary brush-bars 23 act to dislodge such matter, thus preventing choking up of the grate. Since the brush-bar structure is vertically adjustable, the brushes may be brought as close to the grate as may be necessary for the most efficient work under different conditions.

The material passing through the grate bars and falling onto the plate 6 may, as previously stated, contain some kernels, and it is to save any such that the upper shaker 77 is provided. The material on the plate 6 gradually work to the discharge 7 from which it is carried by elevator 75 to the upper screen 76 of shaker 77. This screen allows the kernels to pass therethrough but retains larger matter, which passes into chute 81 and thence through chute 49 and onto the refuse belt 50. The kernels and smaller matter drop onto the lower shaker screen 82, which retains the kernels but passes anything smaller therethrough and onto plate 85, from which said smaller matter passes into chute 81.

The kernels pass into the suction box chamber 63 through chute 83 and hopper 84.

In said chamber the kernels are acted on by the air blast to clean them of dust and any particles clinging thereto, and they then pass out through the chamber opening 69 to be deposited in any desired receptacle.

The hulled and unhulled nuts, on the grate bars, and any hulls not passing therethrough, finally discharge onto the upper screen 31 of the lower structure 4. The mesh of this screen is of a size to retain the unhulled nuts and larger matter, while allowing the hulled nuts to pass therethrough and onto the members 33—35, which in turn permit smaller matter to pass therethrough and onto the plate 30. Such matter will finally pass through the opening at the lower end of the plate, where it may be gathered in a suitable receptacle to be emptied into the hopper 2 and from there passed to shaker 77, should it be surmised that such matter contains a quantity of kernels worth saving.

The unhulled nuts, etc., remaining on the upper screen 31 pass therefrom into the chute 32 from which they are carried by elevator 41 to the drum 43, there to be treated by the beater members 52. The use of discs on which to mount said beaters prevents too rapid a travel of the nuts from one end of the drum, giving the nuts more time to be acted on by the beaters. Nuts, etc., falling through the drum-screens pass onto the screen 31, to undergo separation as previously described.

Any matter remaining in the drum passes out through the end of the same into the chute 49 and thence onto the refuse belt 50.

The hulled nuts, and any foreign matter on the adjustable screening structure 33—35 are finally deposited in chute 39 from which they are conveyed by the elevator 58 to the chamber 60 of the suction box. There, in the manner previously described, the material lighter than the nuts is either drawn into the fan to be discharged through the flue 77 thereof, or is deflected into the dead-air chamber 62.

The nuts themselves, now perfectly clean, roll onto the main sorting belt 65, alongside which one or more sorters are stationed.

Any obvious refuse is deposited by them on the belt 86, which discharges onto the refuse belt 50.

Should there be however, any unhulled nuts on the picking belt, these are placed on the belt 88, which delivers them to the elevator 41, to be returned to the drum and re-treated therein as well as subsequently.

The nuts remaining on the picking belt pass to the rear end thereof and are discharged into sacks or other suitable receptacles.

Should the machine be used for cracking nuts already hulled, the bars 20 and 21 are set closely enough together to cause the cracking to be done, and such other adjustments as changing the screen sizes, etc., are made throughout the machine to enable the same to handle the relatively smaller sized material.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an almond huller, a longitudinally reciprocating grate structure, a stationary cover mounted above the grate, bars projecting from the under side of the cover and disposed transversely of the grate, in spaced relation thereto, adjustable means supporting the cover spaced from the grate, spring means forcing said cover toward the grate but allowing movement of the cover away from the grate, and means for adjusting the tension of the springs irrespective of the cover adjustment means.

2. In an almond huller, a longitudinally reciprocating grate structure, comprising transversely disposed bars spaced to allow hulls and the like to pass edgewise therebetween, and a stationary brush structure under the grate, said structure comprising narrow bars disposed parallel to the grate bars, and at an angle thereto.

3. In an almond huller, a longitudinally reciprocating grate structure, comprising transversely disposed bars spaced to allow hulls and the like to pass edgewise therebetween, and a stationary brush structure under the grate, said structure comprising bars disposed parallel to the grate bars, and at an angle thereto, and means for adjusting the spacing of said brush bars from the grate as a single unit.

4. In an almond huller, a longitudinally reciprocating grate structure, comprising transversely disposed bars spaced to allow hulls and the like to pass edgewise therebetween, a stationary brush structure disposed under the grate bars, a frame on which said brush structure is mounted, and means for adjusting the spacing of the frame from the grate.

5. In an almond huller, a longitudinally reciprocating grate structure, comprising transversely disposed bars spaced to allow hulls and the like to pass edgewise therebetween, a stationary brush structure disposed under the grate bars, a frame on which said brush structure is mounted, stationary rods projecting transversely under said frame at longitudinally spaced intervals, said rods passing through slots provided in the frame, and extending at an angle thereto, and means for moving said frame longitudinally.

6. In an almond screening apparatus, an adjustable screening structure comprising fixed horizontal plates transversely disposed and set in spaced and parallel relation, and similar plates disposed adjacent said fixed plates and arranged for horizontal sliding movement relative thereto.

7. An almond hulling and separating apparatus comprising a main hulling structure having upper and lower surfaces to retain the hulled nuts and smaller matter respectively, a screening structure under the hulling structure comprising vertically spaced screens, the upper one of which receives the material from the upper surface of the huller and the lower one retains matter passing through the upper screen; an auxiliary hulling device, and means for passing the matter from the upper screen to the auxiliary hulling device, the matter on the lower screen being sent to be cleaned and sorted.

8. An almond hulling and separating apparatus comprising a main hulling structure having upper and lower surfaces to retain the hulled nuts and smaller matter respectively, a screening structure under the hulling structure comprising vertically spaced screens, the upper one of which receives the material from the upper surface of the huller and the lower one retains matter passing through the upper screen; an auxiliary hulling device, and means for passing the matter from the upper screen to the auxiliary hulling device, and air cleaning means arranged to act on the matter from the lower screen to separate the hulled nuts from any other matter.

9. An almond hulling and separating apparatus comprising a main hulling structure having upper and lower surfaces to retain the hulled nuts and smaller matter respectively, a screening structure under the hulling structure comprising vertically spaced screens, the upper one of which receives the material from the upper surface of the huller and the lower one retains matter passing through the upper screen; an auxiliary hulling device, and means for passing the matter from the upper screen to the auxiliary hulling device, an air-suction cleaning structure to which the matter on the lower screen passes to remove foreign matter from the hulled nuts, and a sorting belt onto which said nuts pass from the cleaner.

10. An almond hulling and separating apparatus comprising a main hulling structure having upper and lower surfaces to retain the hulled nuts and smaller matter respectively, a screening structure under the hulling structure comprising vertically spaced screens, the upper one of which receives the material from the upper surface of the huller and the lower one retains matter passing through the upper screen; an auxiliary hulling device, to which the matter from the upper screen is passed, the lower screen containing the hulled nuts, a shaker structure into which the matter on the lower surface of the main hulling device is deposited, and means in said shaker for segregating any kernels from accompanying foreign matter.

11. An almond hulling and separating apparatus comprising a main hulling structure having upper and lower surfaces to retain the hulled nuts and smaller matter respectively, a screening structure under the hulling structure comprising vertically spaced screens, the upper one of which receives the material from the upper surface of the huller and the lower one retains matter passing through the upper screen; an auxiliary hulling device, and means for passing the matter from the upper screen to the auxiliary hulling device, the matter on the lower screen being sent to be cleaned and sorted, means whereby any nuts hulled in the auxiliary device will be returned onto said upper screen, and a refuse belt onto which any material of larger area than the hulled nuts and remaining in said auxiliary device will be deposited.

In testimony whereof I affix my signature.

LOUIS K. VAUGHAN.